(12) United States Patent
Chintawongvanich

(10) Patent No.: US 6,427,531 B1
(45) Date of Patent: Aug. 6, 2002

(54) ACTIVE ACOUSTIC PHASED ARRAY ANTENNA SYSTEM

(76) Inventor: Prasan Chintawongvanich, 1994 Salinas Dr., Las Cruces, NM (US) 88011

(*) Notice: Subject to any disclaimer, the term of this patent is extended or adjusted under 35 U.S.C. 154(b) by 0 days.

(21) Appl. No.: 09/437,583

(22) Filed: Nov. 9, 1999

(51) Int. Cl.[7] ............................. G01F 13/00; G01P 5/00

(52) U.S. Cl. .................................................. 73/170.13

(58) Field of Search .............................. 73/189, 170.13, 73/861.1, 861.25; 342/25, 157; 367/90

(56) References Cited

U.S. PATENT DOCUMENTS

| | | |
|---|---|---|
| 3,889,533 A | 6/1975 | Balser |
| 4,219,887 A | 8/1980 | MacCready, Jr. |
| 4,558,594 A | 12/1985 | Balser et al. |
| 4,647,933 A | 3/1987 | Hogg |
| 5,509,304 A | 4/1996 | Peterman et al. |

OTHER PUBLICATIONS

Balser, M., et al., "Remote Wind Sensing by Acoustic Radar," *J. Appl. Meteorology*, vol. 15, pp 50–58 (Jan. 1976).
Neff, W.D., et al., "Acoustic Remote Sensing," D.H. Lenschow, Editor, American Meteorological Society, Boxton MA, pp 201–239 (Sep. 1984).

*Primary Examiner*—William Oen
(74) *Attorney, Agent, or Firm*—Jeffrey D. Myers; Nancy E. Ownbey

(57) ABSTRACT

A hyper-sound detection and ranging system for remote wind measurements that provides all three orthogonal components of a three dimensional wind field on a single transmission pulse utilizing simultaneous beams of acoustic waves. The present invention measures atmospheric wind by transmitting a broad beam acoustic pulse to illuminate a zone of the atmosphere, and then measuring the Doppler shifts in the backscatter signals arrived at the system from various directions along the broad beam projection utilizing simultaneous receiving beams of narrow beamwidth. The simultaneous receiving beams are obtained by means of a hybrid of analog and digital beamforming technologies that enables simultaneous formation of a programmable number of beams in any direction within the designed fields-of-view.

13 Claims, 6 Drawing Sheets

Legend:
Trans = Transmitting beam
Rec = Receiving beam

| Beam Identification | Look-Direction (degree) | |
|---|---|---|
| | Azimuth | Elevation |
| Trans | 45.00 | 15.00 |
| Rec #1 | 45.00 | 0.82 |
| Rec #2 | 3.88 | 8.50 |
| Rec #3 | 1.96 | 16.51 |
| Rec #4 | 1.26 | 24.67 |
| Rec #5 | 88.61 | 24.67 |
| Rec #6 | 70.34 | 25.99 |
| Rec #7 | 54.63 | 29.38 |

ACTIVE ACOUSTIC PHASED ARRAY ANTENNA SYSTEM

BACKGROUND OF THE INVENTION

1. Field of the Invention (Technical Field)

The present invention relates to a remote wind sensing instrument for measurements of atmospheric wind. More specifically, the present invention relates to an active acoustic phased array antenna system that measures all three orthogonal components of a three dimensional wind field on a single transmission pulse utilizing simultaneous beams of acoustic waves.

2. Background Art

It is commonly known that changes in the frequency of transmitted electromagnetic or acoustic waves propagating the atmosphere are due to the movements of the atmospheric media. This Doppler effect enables remote measurements of atmospheric wind by transmitting a pulse of signal to illuminate a volume of the atmosphere and then measuring the changes in frequency, called Doppler shifts, of the reflected waves scattered by air in the illuminated volume. In the early development of remote wind sensing instrument, radio waves were first exploited for Doppler shift measurements. Subsequently, after the field of Doppler radar had been well established, acoustic waves were employed for remote wind measurement applications. Many of the principal operations used in acoustic remote wind sensing today had been adopted from the field of Doppler radar.

The term SODAR is an acronym for "SOund Detection And Ranging", and SODAR or Doppler sodar is the term used for a remote wind measurement system utilizing acoustic waves for Doppler shift detection. Measurements that provide the information of atmospheric wind speed and direction as a function of height above the ground are called vertical wind profiles. Doppler radars and sodars are commonly used for vertical wind profiling. Hence, they are often referred to as radar and sodar wind profilers. Typically, a wind profiler is arranged into either a monostatic or bistatic configuration as discussed by Neff, et at., Probing the Atmospheric Boundary Layer, D. H. Lenschow, Editor, *American Meteorological Society*, Boston, Mass., pp. 201–239, September 1984. A monostatic wind profiling system such as those described in U.S. Pat. No. 4,558,594, to Balser, et al., entitled "Phased Array Acoustic Antenna," U.S. Pat. No. 4,647,933, to Hogg, entitled "Phased Antenna Array for Wind Profiling Applications," and U.S. Pat. No. 5,509,304, to Petermann, et al., entitled "Phased Array Acoustic Antenna System," concerns only with backscatter signals, and uses a common antenna for both the transmission and reception of signals that propagate along the same path. A bistatic wind profiling system such as those described in U.S. Pat. No. 3,889,533, to Balser, entitled "Acoustic Wind Sensor," and U.S. Pat. No. 4,219,887, to MacCready, Jr., entitled "Bistatic Acoustic Wind Monitor System," and in J. Appl. Meteo. vol. 15, pp. 50–58, 1976, on the other hand, has different transmission and reception propagation paths, and hence, uses different antennas for the transmission and reception.

The atmosphere absorbs and scatters acoustic waves much more strongly than it does electromagnetic waves. Strong absorption limits the maximum height range of SODAR systems to about 1 km. Strong scattering, on the other hand, provides the advantage of well defined scattering signals contributing to good spatial resolution, a favorable circumstance to employ SODARs for remote wind measurements in a 1-km height range.

Basically, a minimum of three orthogonal components is required for a three dimensional wind vector measurement. Therefore, in a typical monostatic configuration, a wind profiler employs three fixed beams: two tilted beams that are slightly off the vertical to the east-west and north-south directions, and a vertical beam. Two additional tilted beams found on some wind profiling systems are used for consistency check. Doppler shifts in the backscatter signals received on the axis of each beam are interpreted as wind components in the radial direction. The measured components along different axes are transformed into components in the east-west, north-south, and vertical directions resulting in a three dimensional wind vector profile. Prior to the development of a phased array antenna technology, individual antenna was required for each radial wind component measurements. With the advancement in the phased array antenna technology, many wind profilers nowadays employ a single phased array antenna capable of beam steering for the various beams requirement.

The utilization of phased array antenna technology has notably reduced the size and improved the mobility of wind profilers. For example, a single phased array antenna can be employed in place of three separate antennas in a monostatic wind profiling system. Despite this development, however, the technique involved in Doppler wind measurements remains unchanged. For a three-dimensional wind measurement, a monostatic wind profiler obtains radial wind components along a minimum of three fixed beams sequentially on a pulse-by-pulse basis. Following a transmission of a pulse, backscatter signals are received for Doppler wind processing. Backscatter signals from lower height ranges arrive before those from upper height ranges. The time delay for receiving backscatter signal from the highest height range is referred to as a pulse repetition period. A sequence of pulsing is typically arranged in a cyclic order of the number of beams. For example, the pulsing sequence of a wind profiling system employing three fixed beams is: (1, 2, 3), (1, 2, 3), . . . (1, 2, 3). A pulse repetition period of one beam must be completed prior to an initiation of the next pulse repetition period in the sequence. If the pulse repetition periods are overlapped, signals from the current pulse will start to be received while signals from the previous pulse are still arriving. Unless some other information is available, it is not possible to interpret these signals.

For wind profilers employing radio waves that propagate the atmosphere at a speed of light, approximately $3 \times 10^8$ m/s, a pulse repetition period is of an order of 10 $\mu$s and is considered insignificant. However, for wind profilers employing acoustic waves that propagate the atmosphere at a relatively slow sonic speed, approximately 340 m/s, the pulse repetition period is large and becomes a significant performance load factor. For example, it takes 2 full seconds to retrieve backscatter signals from a height range of 340 m (i.e., a round trip distance of 680 m). To complicate the matter, because the individual radial wind components are temporally separated from one another by at least one pulse repetition period, averaging of these wind components over many consecutive pulsing sequences is required in order to obtain meaningful wind measurements. Thus, the propagation delay associated with the retrieval of backscatter signals in the sequential pulsing operation becomes a significant problem for SODARs to achieve a high temporal resolution.

In a conventional spectral processing, spectral estimation is implemented by a discrete frequency analysis using a Fast Fourier Transform (FFT). The detectability of a signal peak is enhanced by an incoherent spectral averaging process that averages a number of consecutive power spectra to smooth out the noise floor and better define the signal peak for a greater measurement resolution. Because the incoherent spectral averaging process does not increase the signal-to-noise ratio (S/N), a large number of spectra is required for average processing. Typically, for spectral processing of SODAR signals, a minimum of 20 spectra is required for each radial wind component. This translates to a minimum of 60 pulse repetition periods for measurements of a three dimensional wind profile. Thus, in the conventional spectral processing, a greater spatial resolution is rendered at an expense of a lower time resolution resulting from the many pulse repetition periods required in the spectral averaging process.

It is seen from the discussions presented that the signal retrieval technique originally developed for Doppler radars is inefficient for used with Doppler sodars due the vast difference in the propagation speed between electromagnetic and acoustic waves. Furthermore, long averaging periods are required to contend with the incoherent noise retained in the conventional spectral processing resulting in a poor measurement time resolution. The two components that can significantly improve the performance of wind profilers employing acoustic waves for Doppler measurements are therefore: (1) a more efficient signal retrieval technique that eliminates the propagation delay associated with the sequential pulsing operation to significantly increase the measurement time resolution, and (2) an improved spectral processing technique that eliminates the need for a time consuming incoherent spectral averaging process to significantly increase the spatial resolution of the measurements without decreasing the time resolution.

The present invention is an active acoustic phased array antenna system that simultaneously measures all three orthogonal components of a three dimensional wind vector profile on a single transmission pulse to significantly increase the measurement time resolution. The system accomplishes this task by transmitting a broad beam acoustic pulse to illuminate a zone of the atmosphere, and then measuring Doppler shifts in the backscatter signals arrived at the system from various directions along the broad beam projection utilizing simultaneous receiving beams of narrow beamwidth.

A HYPER-SODAR employs separate transmitting and receiving array antennas that are co-located in the same antenna enclosure. Because of the separate transmitting and receiving antennas employed, HYPER-SODAR is classified as a bistatic system. The transmitting array antenna is used to transmit a broad beam acoustic pulse to illuminate a zone of the atmosphere producing scattered waves along the propagation path. The receiving array antenna is used to produce multiple beams of narrow beamwidth for simultaneous reception of backscatter signals from multiple directions along the broad beam projection, eliminating the propagation delay associated with the sequential pulsing operation. The simultaneous beams are obtained by means of a hybrid of analog and digital beamforming technologies that enables simultaneous forming of a programmable number of receiving beams in any look-directions within the designed fields-of-view.

SUMMARY OF THE INVENTION (DISCLOSURE OF THE INVENTION)

A preferred embodiment of the present invention comprises a hyper-sound detection and ranging system for high-resolution remote wind measurements comprising a transmitting array of acoustic transducer elements for transmitting a pulse of broad beam acoustic waves toward a zone spaced from the transmitting array, signal transmitting means comprising a signal generating means for generating a transmit signal, and an amplifier for amplifying the transmit signal for driving the elements in the transmitting array, a receiving array of acoustic transducer elements for simultaneous reception of reflected acoustic waves scattered by air in the zone from a plurality of directions along the broad beam projection utilizing a plurality of simultaneous receiving beams of narrow beamwidth, and signal receiving means comprising a hybrid of analog phased array processing means and digital phase array processing means for simultaneous forming of the receiving beams and providing of the plurality of simultaneous receiving beams in multiple planes on the receiving array for simultaneous reception of the reflected acoustic waves. Preferably, the transmitting array and receiving array are co-located in a common array antenna enclosure, and preferably the transmitting array elements are arranged in a taper configuration providing K rows and L columns of said elements, where K and L are integers, and said K can be equal said L. Preferably, the receiving array elements are arranged in a taper configuration providing M rows and N columns of said elements, where M and N are integers, and said M can be equal said N, and more preferably are electrically grouped row-wise into M rows providing M independent channels referencing to a common ground. The analog phase array processing means preferably comprises M independent phased array processing circuits referencing to the common ground and corresponding to the M independent channels on a one-to-one basis. Preferably, each of the phased array processing circuits comprises a plurality of phase shifting means for phase shifting the elements in corresponding channel, the phase shifting means capable of providing a plurality of element-to-element progressive phase shifts on the channel. The plurality of element-to-element progressive phase shifts on each channel preferably comprise: $\phi_1, \phi_2, \phi_3, \ldots, \phi_P$ where P is an integer, providing P sets of concurrent element-to-element phase shifts of $\{(\phi_1, 2\phi_1, 3\phi_1, \ldots), (\phi_2, 2\phi_2, 3\phi_2, \ldots), (\phi_3, 2\phi_3, 3\phi_3, \ldots), \ldots (\phi_P, 2\phi_P, 3\phi_P, \ldots)\}$ on the channel. In a preferred embodiment, P equals 2, $\phi_1$ equals 0°, and $\phi_2$ comprises at least one value selected from the group consisting of −90° and 90°, and the values provide concurrent element-to-element phase shifts of $(\phi_1, 2\phi_1, 3\phi_1, \ldots)$ and $(\phi_2, 2\phi_2, 3\phi_2, \ldots)$ on each channel. Preferably, each phased array processing circuit further comprises a plurality of signal summing means for summing the plurality of phase shifting means outputs, the signal summing means capable of providing a plurality of phase-shifted sum signals, a plurality of bandpass filters for filtering the plurality of phase-shifted sum signals, the bandpass filters capable of providing a plurality of filtered phase-shifted sum signals, a multiplexer for multiplexing the filtered phase-shifted sum signals, and a sample and hold circuit for synchronized sampling the multiplexer output, the circuit capable of providing filtered phase-shifted sum signal that is synchronized with the filtered phase-shifted sum signals from all other channels.

In a preferred embodiment of the present invention, the digital phase array processing means comprises an M-channel analog-to-digital converter for digitizing outputs of sample and hold circuits from M channels, and a digital phase synthesizer for processing the digitized outputs, wherein the converter and the synthesizer are capable of providing simultaneous receiving beams of narrow beamwidth. Preferably, the digital phase synthesizer comprises a digital beamforming algorithm comprising zero padding of the digitized outputs from M channels, wherein the zero padding provides zero padded data having a vernier sampling interval required for a desired delay quantization, delayed sum of the zero padded data from M channels with NB imposed delays on each channel, where NB is an integer whose value is at least three, providing NB sets of delayed sum data, and interpolation of NB sets of delayed sum data by means of utilizing a finite impulse response (FIR) digital filter obtaining NB sets of signals representing reflected acoustic waves along the projections of NB simultaneous receiving beams. Preferably, the system further comprises a digital computer for controlling the M-channel analog-to-digital converter and for executing the digital beamforming algorithm.

A preferred embodiment of the present invention also comprises a co-spectrum method comprising a co-spectral processing algorithm for computing the co-spectra of signals representing reflected acoustic waves received along each receiving beam of a wind profiling system. Preferably, the co-spectral processing algorithm comprises the steps of utilizing the signals received from the current and immediate previous pulses for the co-spectral processing, and computing the mean frequencies of the co-spectra.

A preferred embodiment of the present invention further comprises a method for determining a three dimensional wind vector profile from a plurality of radial wind components measured on a single transmission pulse, utilizing a hyper-sound detection and ranging system and a co-spectrum method, the method comprising steps of (a) transmitting a pulse of broad beam acoustic waves toward a zone spaced from the transmitting array; (b) producing NB simultaneous receiving beams of narrow beamwidth, where NB is an integer whose value is at least equal to three, for simultaneous reception of signals representing reflected acoustic waves scattered by air in the zone along the projections of the NB receiving beams utilizing the receiving array and signal receiving means; (c) storing the signals in step (b) into buffer #1; (d) repeating steps (a) and (b), and storing the signals in step (b) into buffer #2; (e) computing the NB sets of mean frequencies along the axes of the NB simultaneous receiving beams by means of a co-spectrum method utilizing the signals in buffers #1 and #2; (f) interpreting the differences between each set of the mean frequencies along the receiving beam and the transmitting frequency as wind components in the radial direction; (g) transforming the wind components along the NB different axes into wind components in the east-west, north-south, and vertical directions resulting in a three dimension wind vector profile; (h) repeating steps (a), (b), (c), (e), (f), and (g); (i) repeating steps (d), (e), (f), and (g); and alternately repeating between steps (h) and (i) for a continuous operation. The method preferably comprises utilizing a remote wind sensing instrument comprising a transmitting array of acoustic transducer elements for transmitting a pulse of broad beam acoustic waves toward a zone spaced from said transmitting array; signal transmitting means comprising signal generating means for generating a transmit signal, and an amplifier for amplifying said transmit signal for driving said elements in said transmitting array; a receiving array of acoustic transducer elements for simultaneous reception of reflected acoustic waves scattered by air in the zone from a plurality of directions along the broad beam projection utilizing a plurality of simultaneous receiving beams of narrow beamwidth; and signal receiving means comprising a hybrid of analog phased array processing means and digital phase array processing means for simultaneous forming of said receiving beams and providing of said plurality of simultaneous receiving beams in multiple planes on said receiving array for simultaneous reception of the reflected acoustic waves. Preferably, a spectral processing method is utilized, comprising the steps of receiving reflected acoustic waves along a plurality of simultaneous receiving beams of a wind profiling system; utilizing the signals received from the current and immediate previous pulses for the co-spectral processing; and computing the mean frequencies of the co-spectra.

A primary object of the present invention is to provide a new and more efficient backscatter signal retrieval technique that eliminates the propagation delay associated with the sequential pulsing operation of wind profilers employing acoustic waves to significantly increase the measurement time resolution.

Another object of the present invention is to provide an improved spectral processing technique for Doppler frequency extractions that dismisses the need for a time consumed incoherent spectral averaging process to significantly increase the spatial resolution of the measurements without decreasing the time resolution.

A primary advantage of the present invention is the improved efficiency of signal retrieval;

Another advantage of the present invention is the elimination of propagation delay in signal retrieval; and Yet another advantage of the present invention is the elimination of the spectral averaging process.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

Figure 1:
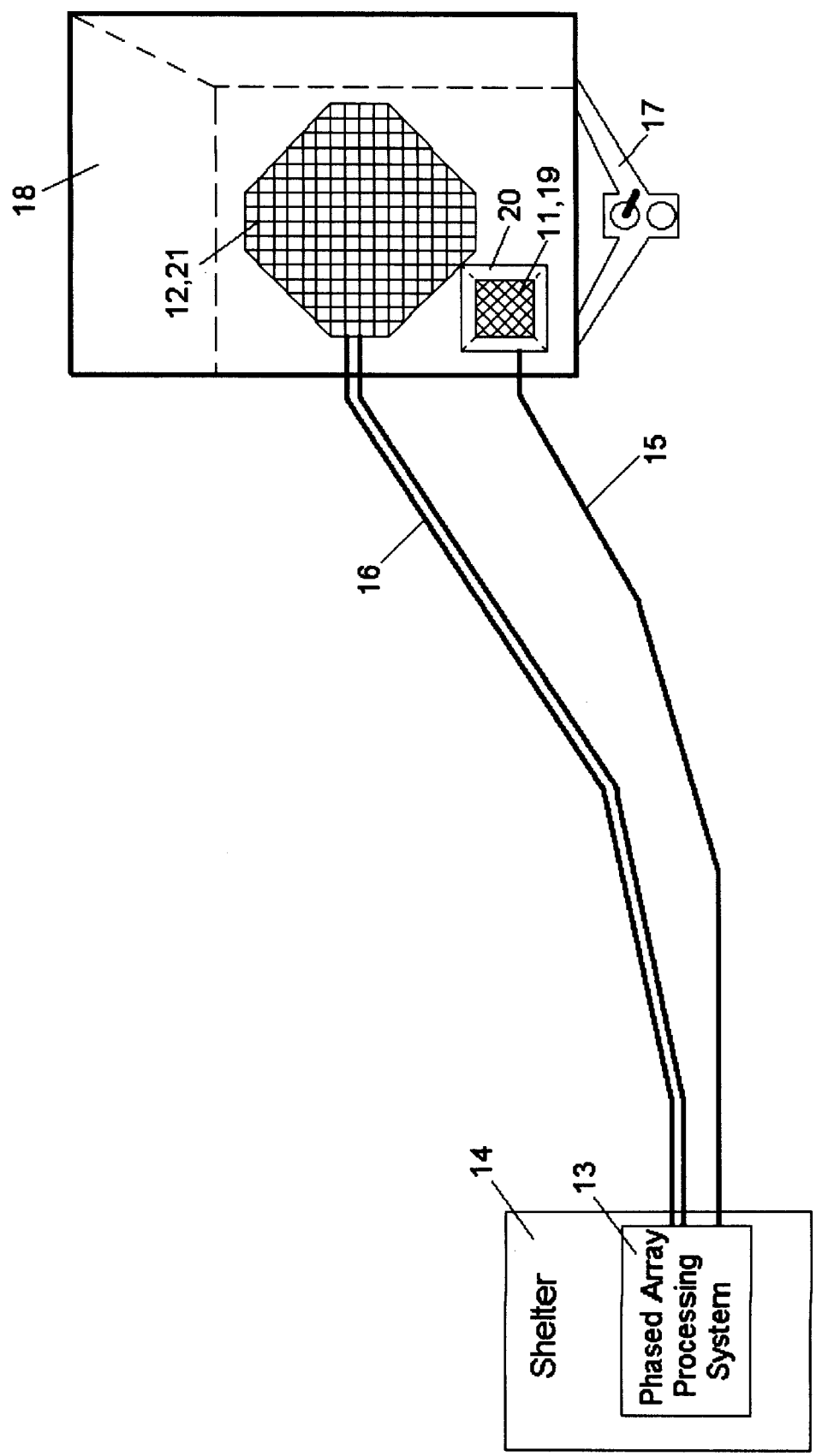
FIG. 1 is a schematic representation of the system in one embodiment.

FIG. 1 is a schematic representation of the present invention, in one embodiment. The system comprises of transmitting 11 and receiving 12 array antennas that are placed outdoor for remote wind sensing, and phased array processing system 13 enclosed in an electronic cabinet that is housed inside air conditioned shelter 14 for signal processing under an indoor environment. The transmitting/receiving array antennas are connected to the electronic system through shielded transmission cable 15 and shielded multi-wire reception cables 16.

Figure 2A:
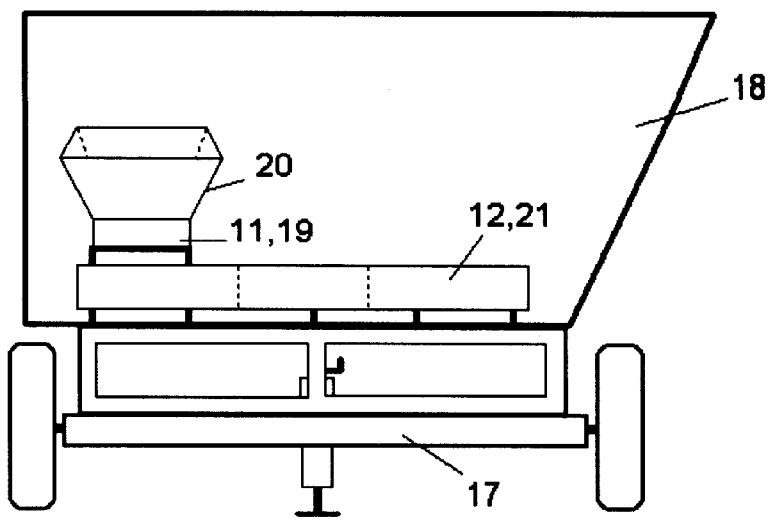
FIG. 2A is the front view of the trailer mounted transmitting/receiving array antennas.
Figure 2B:
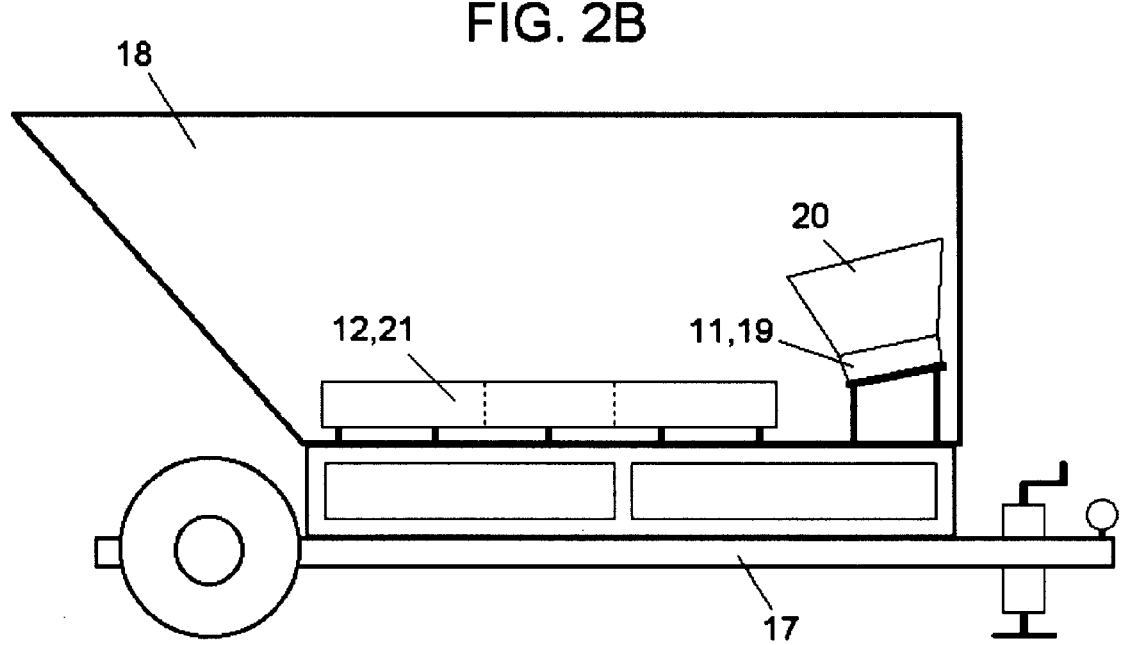
FIG. 2B is the side view of the trailer mounted transmitting/receiving array antennas.
Figure 3A:
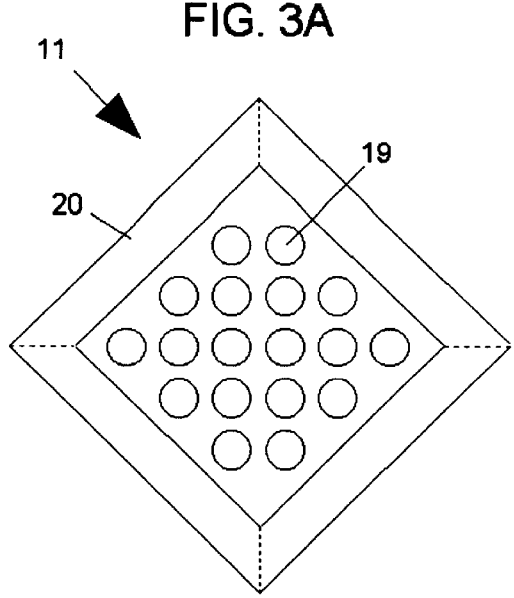
FIG. 3A is the top view of the transmitting array antenna.
Figure 3B:
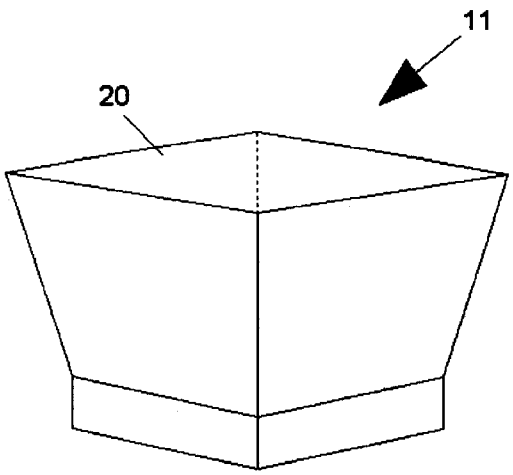
FIG. 3B is the side view of the transmitting array antenna.
Figure 4:
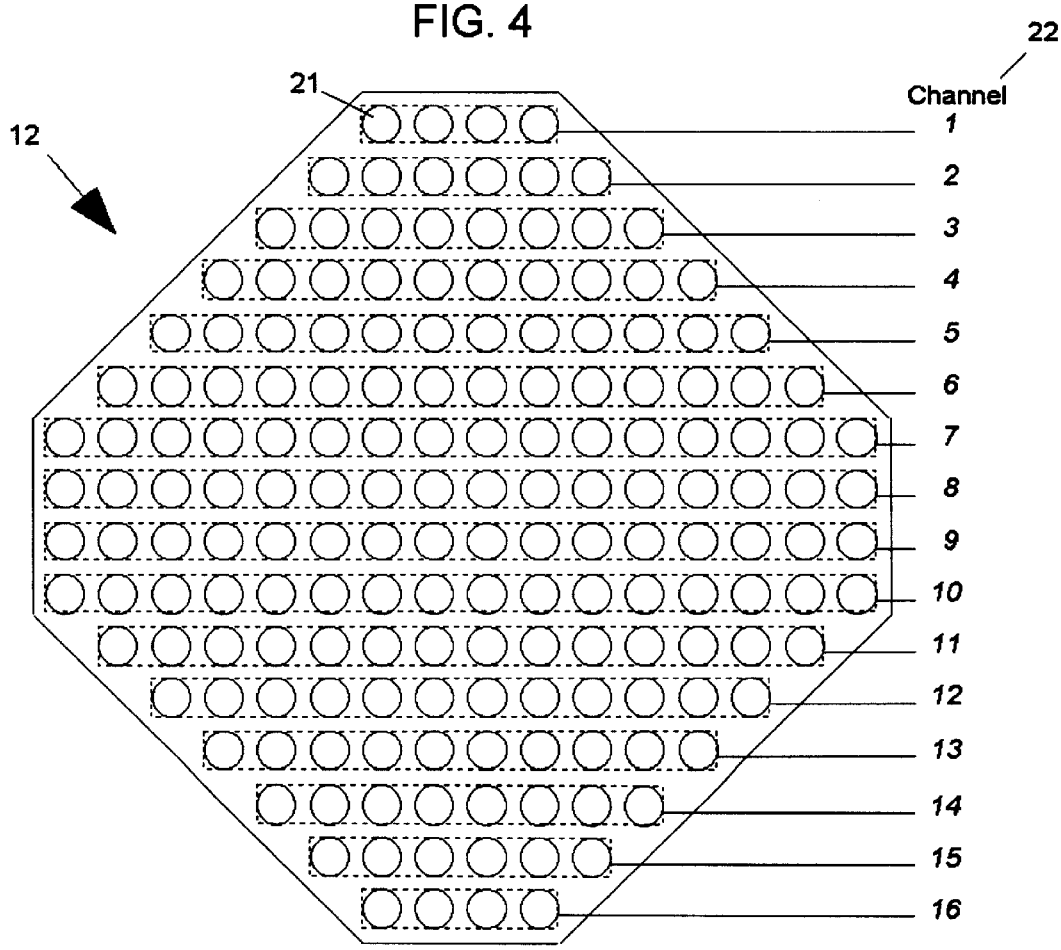
FIG. 4 is the top view of the receiving array antenna.

Transmission and reception are realized by separate transmitting and receiving array antennas that are co-located in a trailer 17 mounted antenna enclosure 18 as depicted in FIG. 2A and FIG. 2B. The interior of the antenna enclosure is padded with acoustic absorbing foam to minimize interferences from ground clutter and other noise sources. Transmitting antenna 11 is a 5×6 taper distributed planar array utilizing 18 acoustic transducer elements 19 for transmission. FIG. 3A is the top view of the transmitting antenna showing the arrangement of its array elements having an inter-element spacing of approximately 0.075 m, and FIG. 3B is the side view showing the transmitting antenna with its hopper shape horn 20. It is designed to transmit board beam acoustic pulses of signals around 2,300 Hz with a half-power beamwidth of approximately 38°. Receiving antenna 12 is a 16×16 planar array utilizing 172 acoustic transducer elements 21 in a taper configuration as shown in FIG. 4. The receiving array antenna is designed to operate at frequencies near 2,300 Hz. Spacing between the elements is approximately 0.085 m resulting in an effective aperture of approximately 1.36 m².

Referring to FIG. 4, elements 21 of receiving array antenna 12 are electrically grouped row-wise into 16 rows to provide 16 independent output channels 22 such that a plurality of progressive phase shifts between the elements of one row can be made independent of the others. The array antenna is capable of producing a programmable number of receiving beams of narrow beamwidth with a half-power beamwidth of approximately 9° utilizing a hybrid of analog and digital beamforming technologies discussed in the paragraphs as follows.

Figure 5:
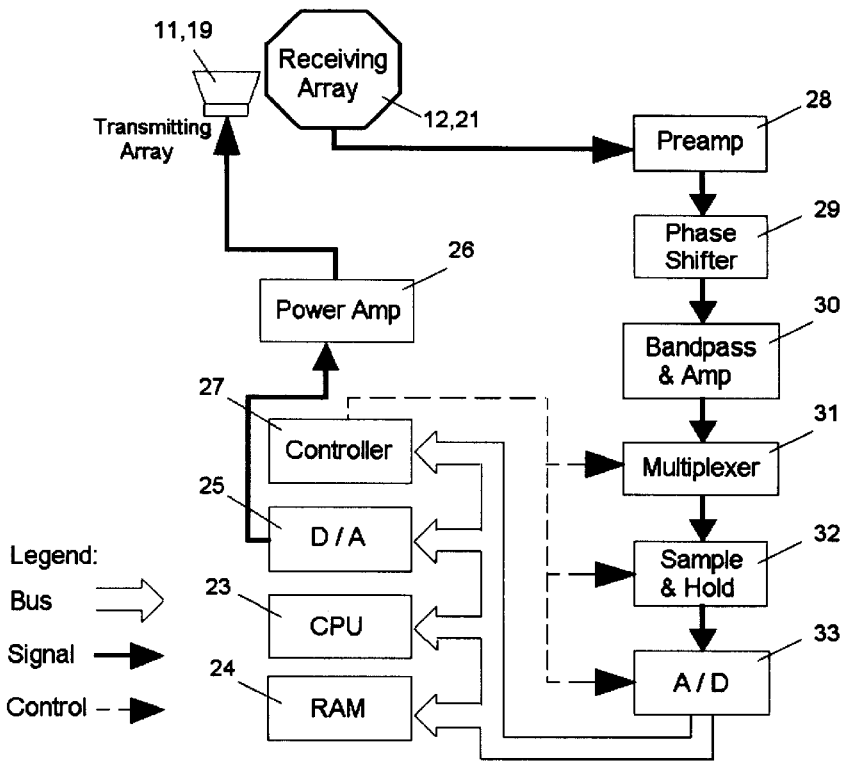
FIG. 5 is the phased array processing architecture of the system that incorporates a hybrid of analog and digital beamforming technologies.

FIG. 5 is the phased array processing system architecture. Beamforming is efficiently accomplished by combining both the analog and digital beamforming technologies. Signals received on the array antenna are phase shifted row-wise by a plurality of analog phase shifters and are phase shifted column-wise by a digital phase synthesizer to produce a column of programmable number of beams simultaneously. By multiplexing the row-wise phase shifted signals, multiple columns of beams can be concurrently obtained. The analog beamforming technique provides the speed required for simultaneous beamforming in multiple planes, while the digital beamforming technique used provides the added flexibility. A hybrid of the analog and digital beamforming techniques employed enables simultaneous forming of a programmable number of beams in any look-directions within the designed fields-of-view.

Doppler frequency processing of the present invention is based on a novel signal processing technique, the co-spectrum method, that induces a cancellation of incoherent noise components embedded in the backscatter signals to significantly increase the S/N by means of a cross-correlation $\varphi_{12}(\tau)$ process. The cross-correlation process involves a correlation of signal from the current pulse $s_1(t)$ to the signal from the immediate previous pulse $s_2(t)$ according to:

$$\varphi_{12}(\tau) = \frac{1}{T} \int_{-T/2}^{T/2} s_1(t) s_2(t+\tau) dt$$

Because random noise from one pulse is uncorrelated to that from the other, the incoherent noise components will be canceled to a negligible level. On the other hand, signal in the co-spectrum $\Phi_{12}(n)$ will be coherently enhanced. The co-spectrum $\Phi_{12}(n)$ is equivalently a Fourier transform of the cross-correlation $\varphi_{12}(\tau)$ according to:

$$\Phi_{12}(n) = \frac{1}{T} \int_{-T/2}^{T/2} \varphi_{12}(\tau) \exp(-jn2\pi f \tau) d\tau$$

The Doppler frequency is determined from a mean frequency estimate $\bar{f}$ weighted over a passband $f_u$-$f_l$ by the expression:

$$\bar{f} = \int_{f_l}^{f_u} f \cdot \Phi_{12}(f) df \bigg/ \int_{f_l}^{f_u} \Phi_{12}(f) df$$

where $\Phi_{12}(f)$ is the co-spectrum estimate.

Figure 9:
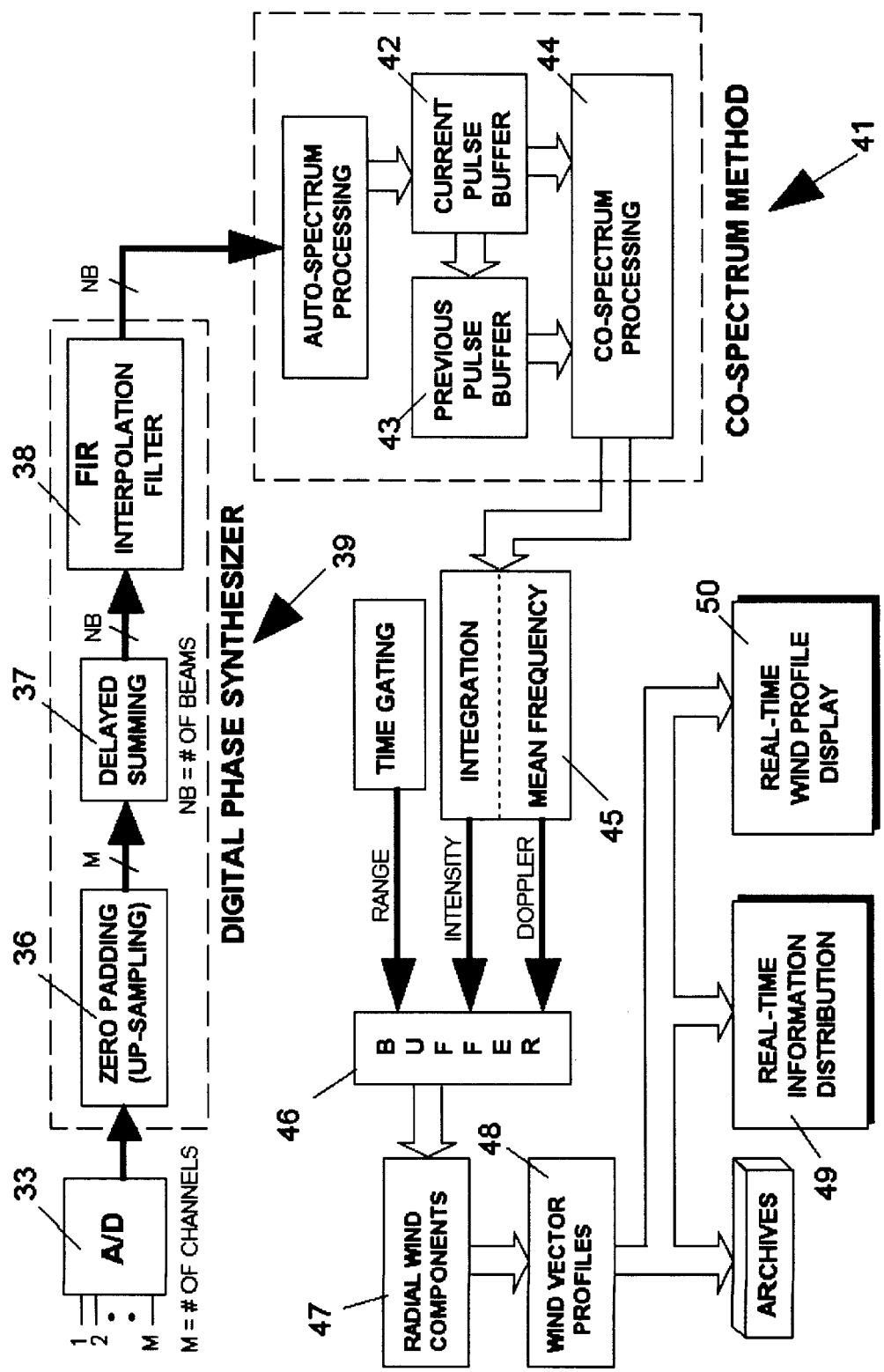
FIG. 9 is the wind processing architecture of the system showing an implementation of the digital phase synthesizer and co-spectral processing.

Wind processing architecture of the present invention is summarized in FIG. 9. Beamforming of the digitized signal is performed by digital phase synthesizer 39 shown which produces a programmable number of beams simultaneously. The Doppler frequency information carried within each beam is extracted by means of co-spectrum method 41 which utilizes spectral contents of backscatter signals from the current and immediate previous pulses stored in the current and previous pulse buffers 42, 43 for co-spectral processing 44. Doppler frequency is determined from the mean frequency estimate 45 described by Eq. (3). This information is queued in a buffer 46 for the computation of radial wind components 47, three dimensional wind profiles 48, and subsequently, real-time information distribution 49 and display 50.

Industrial Applicability

The invention is further illustrated by the following non-limiting examples:

EXAMPLE 1

Referring to FIG. 5, in an operation, the system illuminates a zone of the atmosphere with a burst (typically, 50 to 300 ms) of broad beam acoustic pulse by dispatching digital signals stored in RAM 24 to digital-to-analog converter (D/A) 25 at a programmable rate near 2,300 Hz and driving the converted analog signals through elements 19 of transmitting array antenna 11 via power amplifier 26. On the reception, backscatter signals received on receiving array antenna 12 are preamplified by an array of preamplifiers 28 prior to a plurality of row-wise element-to-element progressive phase shifts imposed by an array of analog phase shifters 29. In a configuration of the preferred embodiment, two element-to-element progressive phase shifts $\phi_1$ and $\phi_2$, where $\phi_1$ is 0° and $\phi_2$ is exclusively either −90° or 90°, are imposed to produce concurrent row-wise element-to-element phase shifts of ($\phi_1$, $2\phi_1$, $3\phi_1$, . . . ) and ($\phi_2$, $2\phi_2$, $3\phi_2$, . . . ) on each channel. However, a plurality of element-to-element progressive shifts: $\phi_1$, $\phi_2$, $\phi_3$, . . . , $\phi_P$ where P is an integer, can be imposed on the present invention to produce P sets of concurrent row-wise element-to-element phase shifts of {($\phi_1$, $2\phi_1$, $3\phi_1$, . . . ), ($\phi_2$, $2\phi_2$, $3\phi_2$, . . . ), ($\phi_3$, $2\phi_3$, $3\phi_3$, . . . ), . . . , ($\phi_P$, $2\phi_P$, $3\phi_P$, . . . )} on each channel. Following a sequence of bandpass summing, filtering, and amplification chain 30 made on the phase shifted signals in each channel, the row-wise phase shifted signals from all channels are digitized to a 12-bit data by a 16-channel analog-to-digital converter (A/D) 33 utilizing an array of multiplexers 31 that are controlled by controller 27 to sort out the $\phi_1$ and $\phi_2$ phase shifted data. An array of sample and hold (S&H) circuits 32 are employed at the front-end of A/D 33 to virtually eliminate channel to channel skewness. Subsequently, the digitized data are used for digital beamforming and Doppler frequency processing in CPU 23.

Figure 6:
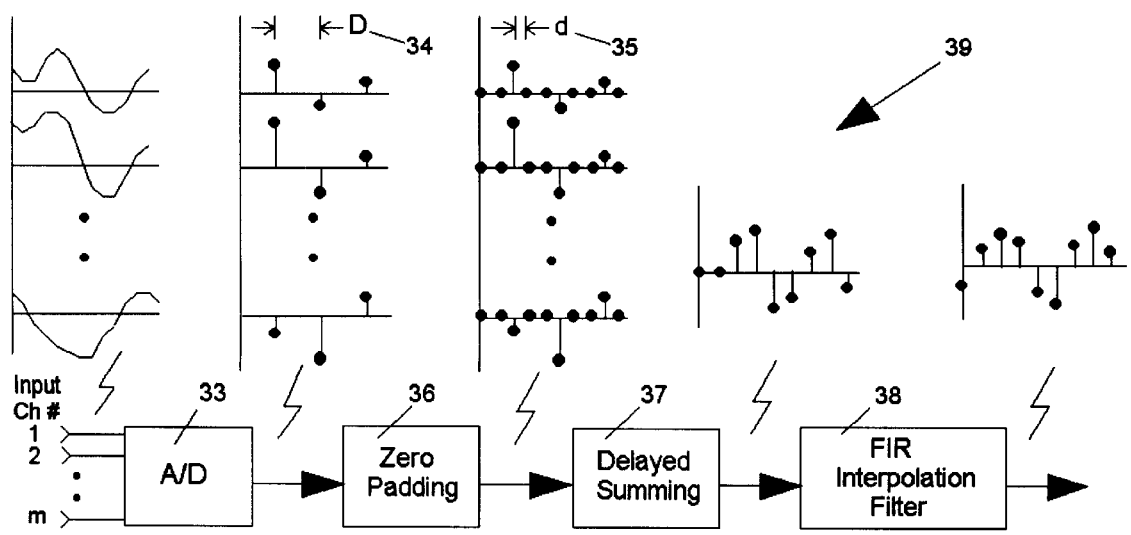
FIG. 6 is an implementation of a digital beamforming process utilizing a digital phase synthesizer that enables simultaneous formation of a programmable number of receiving beams with a sampling rate consistent with the Nyquist frequency.

Conventional time-domain digital beamforming is realized by summing of time delayed signals from the output channels of an array antenna. Typically, the time delays are matched to the anticipated propagation delays to produce phase shifted wavefronts that enhance the amplitude of coherent waves arriving from a specific direction. The disadvantage of this technique is due to the high sampling rate requirement on the quantization of vernier time delays required to produce a set of beams with a desired number of look-directions. The present invention adopts a novel approach to digital beamforming that requires samples at a rate consistent with the Nyquist frequency $f_N$. The approach uses a simple, but highly significant principal of waveform reconstruction of band limited signals. The desired quantization associated with the high sampling rate is achieved by means of zero padding, and interpolating the zero padded data using a finite impulse response (FIR) digital filter. An implementation of the beamforming process by digital phase synthesizer 39 is illustrated in FIG. 6, where waveforms from the output channels of an array antenna are digitized at a sampling interval $D=1/f_N$ 34. The vernier sampling interval d 35 required for the delay quantization is implemented by zero padding 36 the digitized data. Beamforming is then performed by delayed summing 37 of the zero padded data from all channels with a desired delay and interpolating with FIR filter 38. By imposing a set of NB desired delays on the zero padded data from all channels, where NB is an integer, a set of data representing NB simultaneous beams are obtained.

EXAMPLE 2

Figures 7, 8:
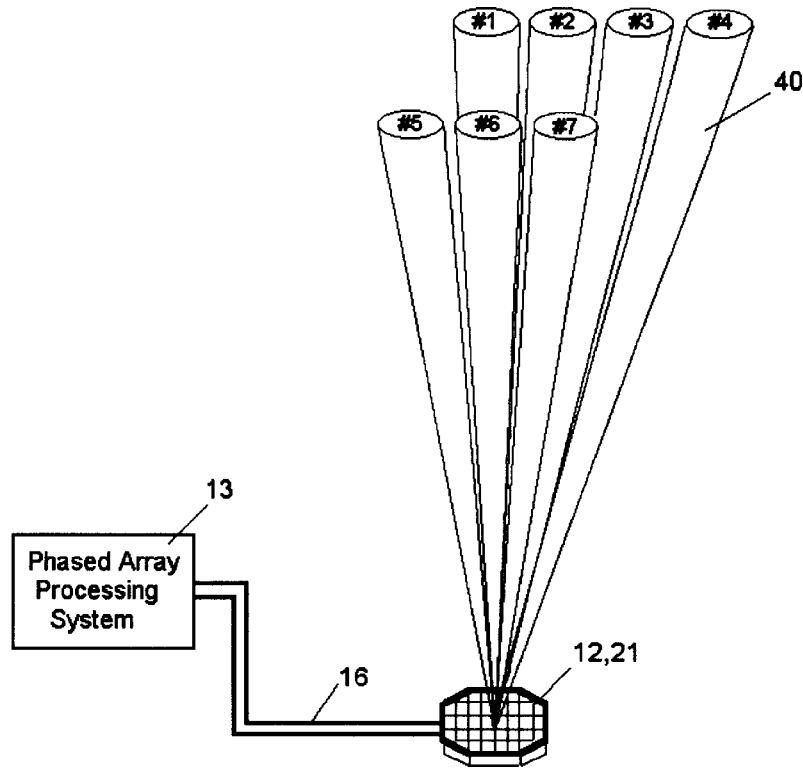
FIG. 7 is a schematic representation of seven simultaneous receiving beams produced by the present invention.
FIG. 8 is the look-directions of the transmitting and receiving beams expressed as a function of azimuth and elevation angles.

A programmable number of simultaneous receiving beams can be produced by the present invention. An example of simultaneous receiving beams 40 schematically shown in FIG. 7 is one of the programmable scenarios. Referring to FIG. 7, a set of seven simultaneous receiving beams 40 are produced by the system following a broad beam acoustic pulse transmission. The look-directions of the transmitting and receiving beams are tabulated in FIG. 8 as a function of azimuth and elevation angles. The total radiation patterns resulting from coupling the receiving beam radiation patterns with the transmitting beam radiation pattern are implied for the tabulated receiving beam look-directions. In a configuration of the preferred embodiment, a three dimensional wind profile can be independently determined from backscatter signals received on any one of the following three sets of beams: (#1, #4, #5), (#1, #3, #6), and (#2, #5, #7) providing three independent measurements of a three dimensional wind profile on a single transmission pulse. For any one of these three sets, Doppler shifts in the backscatter signals along each receiving beam axis are interpreted as wind components in the radial direction. The measured wind components along the different axes are transformed into components in the east-west, north-south, and vertical directions resulting in a three dimensional wind profile. Thus, three concurrent sets of three dimensional wind profiles are available on a single transmission pulse. The extra sets of concurrent wind profiles are available for inferring and cross referencing to improve the accuracy of the measurements.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A hyper-sound detection and ranging system for high-resolution remote wind measurements comprising:
   a transmitting array of acoustic transducer elements for transmitting a pulse of broad beam acoustic waves toward a zone spaced from said transmitting array;
   signal transmitting means comprising a signal generating means for generating a transmit signal, and an amplifier for amplifying said transmit signal for driving said elements in said transmitting array;
   a receiving array of acoustic transducer elements for simultaneous reception of reflected acoustic waves scattered by air in the zone from a plurality of directions along the broad beam projection utilizing a plurality of simultaneous receiving beams of narrow beamwidth; and
   signal receiving means comprising a hybrid of analog phased array processing means and digital phase array processing means for simultaneous forming of said receiving beams and providing of said plurality of simultaneous receiving beams in multiple planes on said receiving array for simultaneous reception of the reflected acoustic waves.

2. The system of claim 1, wherein said transmitting array and said receiving array are co-located in a common array antenna enclosure.

3. The system of claim 1, wherein said transmitting array elements are arranged in a taper configuration providing K rows and L columns of said elements, where K and L are integers, and said K can be equal said L.

4. The system of claim 1, wherein said receiving array elements are arranged in a taper configuration providing M rows and N columns of said elements, where M and N are integers, and said M can be equal said N.

5. The system of claim 4, wherein said receiving array elements are electrically grouped row-wise into said M rows providing M independent channels referencing to a common ground.

6. The system of claim 5, wherein said analog phase array processing means comprises M independent phased array processing circuits referencing to said common ground and corresponding to said M independent channels on a one-to-one basis.

7. The system of claim 6, wherein each of said phased array processing circuits comprises a plurality of phase shifting means for phase shifting said elements in corresponding channel, said phase shifting means capable of providing a plurality of element-to-element progressive phase shifts on said channel.

8. The system of claim 7, wherein said plurality of element-to-element progressive phase shifts on each channel comprise: $\phi_1, \phi_2, \phi_3, \ldots, \phi_P$ where P is an integer, providing P sets of concurrent element-to-element phase shifts of $\{(\phi_1, 2\phi_1, 3\phi_1, \ldots), (\phi_2, 2\phi_2, 3\phi_2, \ldots), (\phi_3, 2\phi_3, 3\phi_3, \ldots), \ldots, (\phi_P, 2\phi_P, 3\phi_P, \ldots)\}$ on said channel.

9. The system of claim 8, wherein said P equals 2, $\phi_1$ equals 0°, and $\phi_2$ comprises at least one value selected from the group consisting of −90° and 90°, and wherein said values provide concurrent element-to-element phase shifts of $(\phi_1, 2\phi_1, 3\phi_1, \ldots)$ and $(\phi_2, 2\phi_2, 3\phi_2, \ldots)$ on each channel.

10. The system of claim 8, wherein each said phased array processing circuit further comprises:

a plurality of signal summing means for summing said plurality of phase shifting means outputs, said signal summing means capable of providing a plurality of phase-shifted sum signals;

a plurality of bandpass filters for filtering said plurality of phase-shifted sum signals, said bandpass filters capable of providing a plurality of filtered phase-shifted sum signals;

a multiplexer for multiplexing said filtered phase-shifted sum signals; and a sample and hold circuit for synchronized sampling said multiplexer output, said circuit capable of providing filtered phase-shifted sum signal that is synchronized with said filtered phase-shifted sum signals from all other said channels.

11. The system of claim 1, wherein said digital phase array processing means comprises:

an M-channel analog-to-digital converter for digitizing outputs of said sample and hold circuits from said M channels; and a digital phase synthesizer for processing said digitized outputs, wherein said converter and said synthesizer are capable of providing said simultaneous receiving beams of narrow beamwidth.

12. The system of claim 11, wherein said digital phase synthesizer comprises a digital beamforming algorithm comprising:

zero padding of said digitized outputs from said M channels, wherein said zero padding provides zero padded data having a vernier sampling interval required for a desired delay quantization;

delayed sum of said zero padded data from said M channels with NB imposed delays on each said channel, where NB is an integer whose value is at least three, providing NB sets of delayed sum data; and interpolation of said NB sets of delayed sum data by means of utilizing a finite impulse response (FIR) digital filter obtaining said NB sets of signals representing reflected acoustic waves along the projections of said NB simultaneous receiving beams.

13. The system of claim 12 further comprising a digital computer for controlling said M-channel analog-to-digital converter and for executing said digital beamforming algorithm.

* * * * *